United States Patent Office 2,890,392
Patented June 9, 1959

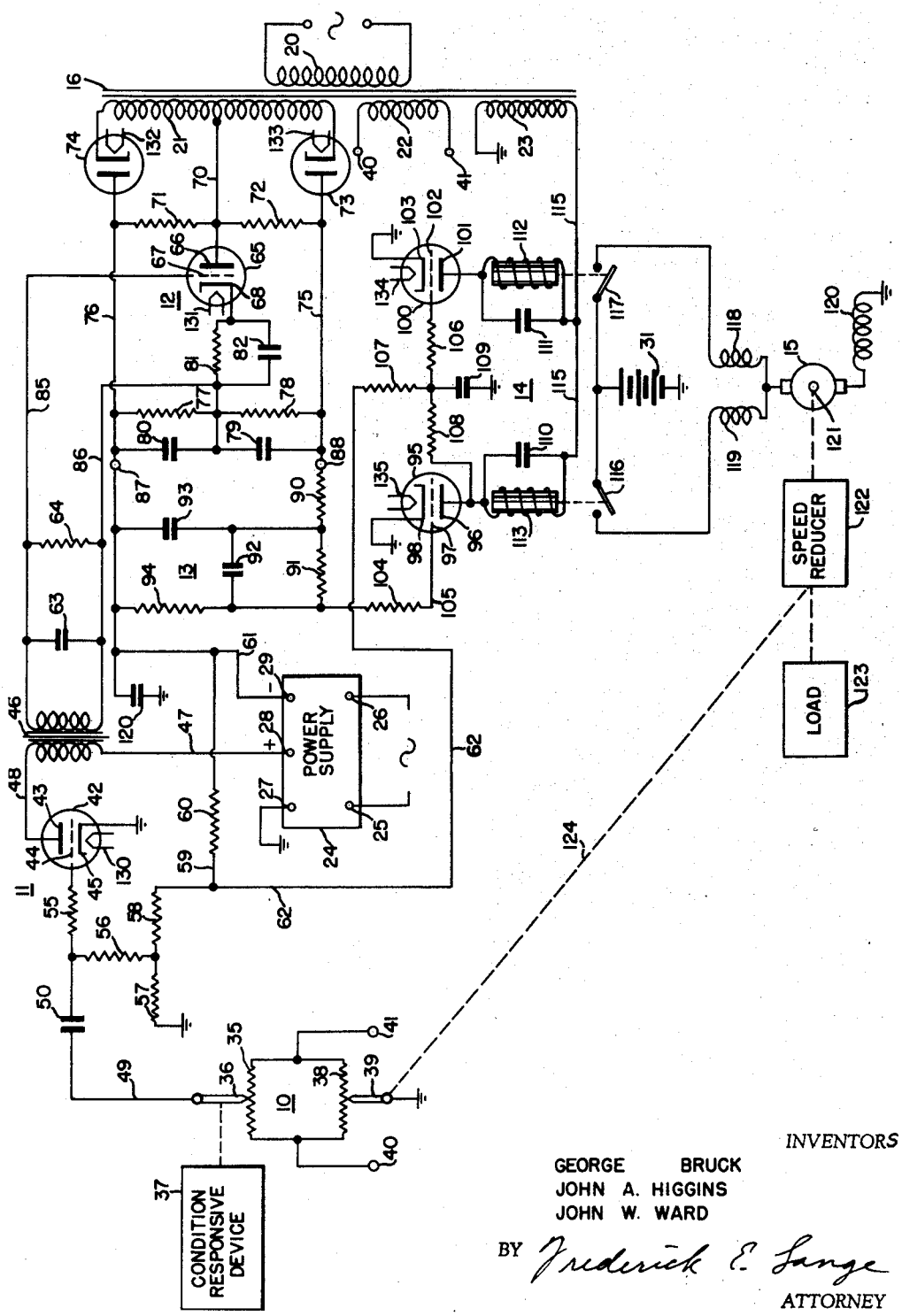

2,890,392
CONTROL APPARATUS

George Bruck, Wyoming, Ohio, and John A. Higgins, Bethpage, and John W. Ward, Syosset, N.Y., assignors to Minneapolis-Honeywell Regulator Company, Minneapolis, Minn., a corporation of Delaware Application December 13, 1954, Serial No. 474,814

11 Claims. (Cl. 317—149)

The present invention relates to control apparatus and more particularly to an electric circuit adapted for use in a system wherein a device or mechanism is to be operated in accordance with changes in the value of a controlling mechanism, which may respond to changes in a variable condition.

An object of the present invention is to provide an improved and simplified control circuit. Another object of the present invention is to provide an improved circuit for an integrally damped control system.

A further object of the present invention is to provide an amplifier having a D.C. driven output stage driven by a direct potential signal which may vary in polarity and magnitude in accordance with the phase and magnitude of an alternating signal.

It is a more specific object of this invention to provide an amplifier having a D.C. driven output stage in which a pair of relays is operated in accordance with a signal so that one or the other of the relays is operative, but connected in such a manner that the simultaneous operation of both relays is prevented.

Other objects and advantages of the invention will become apparent from a consideration of the appended claims, specification, and drawing, in which:

The single figure represents an embodiment of our invention as shown in a control circuit.

Referring now to the drawing, our invention is shown therein by way of example, as applied to a control system wherein a bridge 10, produces a signal indicative of a change from a desired condition, and is coupled to a voltage amplifier 11, which is in turn coupled to a phase detector 12, the output of which is passed through a rate network 13, and in turn coupled to an output stage 14, to operate reversible motor 15, which becomes operative to cause the control system to return to its desired operating condition.

A transformer 16, having a primary winding 20 adapted for connection to a suitable source of alternating voltage, and a plurality of secondary windings, 21, 22, and 23, provides a source of alternating voltage to energize part of the control circuit. A power supply 24 has input terminals 25 and 26 adapted for connection to a suitable source of alternating voltage, terminal 27 connected to ground, terminal 28 for supplying a positive direct potential to said circuit, and terminal 29 for supplying a negative direct potential to said circuit. A suitable source of D.C. voltage, such as battery 31, is used to supply a direct current for the operation of motor 15.

Bridge 10 comprises potentiometer 35 which has an adjustable tap 36 which may be varied by a condition responsive device 37, and potentiometer 38 which has an adjustable tap 39 connected to ground. Tap 39 on potentiometer 38 is operatively connected to the output of speed reducer 122 to provide a means for rebalancing bridge 10. Bridge 10 may be energized from transformer secondary winding 22 by interconnecting the terminals 40 and 41 on bridge 10 and the terminals 40 and 41 on secondary winding 22.

Voltage amplification stage 11 comprises a variable current controlling device in the form of a triode 42 having the usual plate, grid, and cathode, and plate, grid, and cathode terminals 43, 44, and 45. The grid and cathode terminals 44 and 45 form input terminals and the plate and cathode terminals 43 and 45, form a pair of output terminals. Cathode terminal 45 which is common to both the input and output circuits of triode 42 is connected to ground. Triode 42 is energized from the positive terminal 28 on power supply 24, through lead 47, the primary winding of transformer 46, lead 48, plate terminal 43, cathode terminal 45, and thence to ground. The output of bridge 10 is connected to grid terminal 44 of triode 42, through lead 49, condenser 50 and resistor 55. Grid terminal 44 is provided with a negative potential with respect to cathode terminal 45, from negative terminal 29 on power supply 24, through lead 61, resistor 60, lead 59, part of lead 62, resistor 58, resistor 56, and resistor 55. Resistors 57, 58 and 60 are connected in series between negative terminal 29 and ground so as to provide a voltage divider for the negative potential appearing at negative terminal 29. A capacitor 120 is connected to negative terminal 29 through lead 61 to provide filtering of the negative section of the power supply.

Phase detector 12, comprises a variable current controlling device in the form of a triode 65 having the usual plate, grid, and cathode, and plate, grid, and cathode terminals 66, 67, and 68, cathode terminal 68 being common to the input and output circuits, said input terminals consisting of grid terminal 67 and cathode terminal 68, and said output terminals consisting of plate terminal 66 and cathode terminal 68. Triode 65 is energized from secondary winding 21 in a circuit comprising a pair of asymmetrical current conducting devices shown as diode rectifiers 73 and 74, each connected to an extremity of secondary winding 21, lead 70 connected from the center tap of secondary winding 21 to plate terminal 66, resistors 71 and 72 are connected from rectifiers 73 and 74 to plate terminal 66 thereby forming a balanced load for the rectifiers, the output of rectifiers 73 and 74 is also connected to cathode terminal 68 through leads 75 and 76, resistors 78 and 77 having condensers 79 and 80 in parallel therewith, and resistor 81 having condenser 82 in parallel therewith. The output of voltage amplification stage 11, appearing across the secondary winding of transformer 46 having capacitor 63 and resistor 64 in parallel therewith, is connected in circuit with the input terminals of triode 65 through lead 85, grid terminal 67, cathode terminal 68, resistor 81 having a condenser 82 in parallel therewith, and lead 86.

The output of phase detector 12, appearing across terminals 87 and 88, is connected to rate network 13, comprising resistor 90, resistor 91 having condenser 92 in parallel therewith, condenser 93 and resistor 94. Rate network 13 is used to provide a damping effect on the system so as to tend to prevent hunting.

Output stage 14 comprises a variable current controlling device in the form of a triode 95 having the usual plate, grid, and cathode, and plate, grid and cathode terminals, 96, 97 and 98, terminals 97 and 98, comprising an input circuit and terminals 98 and 96 comprising an output circuit, and variable current controlling device in the form of a triode 100 having the usual plate, grid, and cathode and plate, grid, and cathode terminals 101, 102, and 103, terminals 102 and 103 comprising input terminals, and terminals 101 and 103 comprising output terminals. Terminals 98 and 103 are connected to ground. Variable current controlling device 95 is energized from secondary winding 23 through lead 115, relay coil 113, having a condenser 110 in parallel therewith, plate terminal 96 and cathode terminal 98. Variable current controlling device 100 is energized from secondary winding 23 through part of lead 115, relay coil 112 having capacitor 111 in parallel therewith, plate terminal 101, and cathode terminal 103. The output of rate network 13 is connected to grid terminal 97 through resistor 104 and lead 105. Grid terminal 97 is supplied with a negative potential from terminal 29 on power supply 24 through lead 61, resistor 94, resistor 104, and lead 105. A capacitor 120 is provided to filter the voltage appearing at terminal 29 on the power supply. Grid terminal 102 of variable current controlling device 100 is connected to a source of negative potential through resistor 106, resistor 107, lead 62, lead 59, resistor 60, and lead 61. Plate terminal 96 of triode 95 is connected to grid terminal 102 of triode 100 through resistor 108 and resistor 106. Capacitor 109, together with resistor 108, forms a low pass filter for the potentials appearing at the plate 96 of tube 95. Relay coils 113 and 112 have a pair of contacts 116 and 117 connected in circuit with battery 31, motor coils 119 and 118 and motor coil 120. Reversible motor 15 has an output shaft 121 connected to a speed reducer 122. The speed reducer is connected to load 123, which is the controlled device. The output of speed reducer 122 is also connected through a connecting means 124 to tap 39 on potentiometer 38 in order to rebalance bridge 10.

Heaters 130, 131, 132, 133, 134, and 135 may be energized from any suitable source of electrical energy.

The values set forth in the following table are provided to illustrtate more completely a specific control circuit which has been constructed to carry out the principles of our invention. It should be understood, however, that these values are provided by way of example only, and that other values may be used without departing from the invention.

| Reference character: | Value |
| --- | --- |
| 42 | ½ type 12AT7 tube. |
| 46 | UTC type 0-7 transformer. |
| 50 | .022 microfarad. |
| 55 | 470,000 ohms. |
| 56 | 470,000 ohms. |
| 57 | 2,700 ohms. |
| 60 | 4,700 ohms. |
| 63 | .005 microfarad. |
| 64 | 220,000 ohms. |
| 65 | ½ type 12AT7 tube. |
| 71 | 220,000 ohms. |
| 72 | 220,000 ohms. |
| 77 | 220,000 ohms. |
| 78 | 220,000 ohms. |
| 79 | .02 microfarad. |
| 80 | .02 microfarad. |
| 81 | 5,600 ohms. |
| 83 | 10 microfarad. |
| 90 | 22,000 ohms. |
| 91 | 3.3 megohms. |
| 92 | .05 microfarad. |
| 93 | .01 microfarad. |
| 94 | .22 megohms. |
| 95 | ½ type 5687 tube. |
| 100 | ½ type 5687 tube. |
| 104 | 220,000 ohms. |
| 106 | 220,000 ohms. |
| 107 | 390,000 ohms. |
| 108 | 470,000 ohms. |
| 109 | .022 microfarad. |
| 110 | .47 microfarad. |
| 111 | .47 microfarad. |
| 120 | 10 microfarad. |

Operation

Turning now to the operation of the device shown in the drawing, a condition responsive device 37 is used to sense a departure from a desired condition in the operation of a device shown as load 123. A change in the desired operating condition of load 123 will be indicated by a movement of tap 36 on potentiometer 35 to give a signal from bridge 10 of one phase or another and of a magnitude dependent upon the amount of deviation from a desired condition.

When load 123, or the control device, is operating at the desired condition, bridge circuit 10 will be balanced, the potential appearing across the output taps on potentiometer 35 and 38 will be zero, and there will be no signal output to the amplifier.

In this condition of no signal input to voltage amplifier 11, no signal will be applied to phase detector 12, and output stage 14. Consequently motor 15 will remain inoperative. With no signal being applied to the input terminals of phase detector 12, it will be seen that no signal is developed across the output terminals 87 and 88 due to the fact that while triode 65 is conducting on each half cycle, the voltages developed across load resistors 77 and 78 will be equal and opposite to cancel one another.

With no output from phase detector 12, it will be seen that the voltage applied to the grid terminal 97 of triode 95 is of the same magnitude as the source of negative potential on power supply 24. The value of negative potential applied to grid terminal 97 may be chosen so that triode 95 will be slightly conductive to cause a small amount of current to flow through relay coil 113 which is not enough to energize relay coil 113 to close its associated contacts, but enough, due to the rectifying action of triode 95, to cause an average potential, negative with respect to ground, to appear at plate terminal 96 of triode 95, the effect of the positive instantaneous voltages appearing at the plate terminal 96 of triode 95 on the grid terminal 102 of triode 100, is effectively eliminated by the low pass filter comprising resistor 108 and capacitor 109. Grid terminal 102 of triode 100 is connected to plate terminal 96 of triode 95 through resistors 106 and 108. Grid terminal 102 is also connected to negative terminal 29 of power supply 24 to lead 61, resistor 60, lead 59, lead 62, resistor 107, and resistor 106. It is seen that with no signal applied, triode 95 and triode 100 will be conducting a small amount, but not enough to energize their associated relay coils.

Now, assuming there is a change in condition from the desired condition, condition responsive device 37 will sense this change and move tap 36 on potentiometer 35 to unbalance bridge 10 and thereby produce a signal output which is indicative of an error to be corrected. This signal is an alternating signal of the same frequency appearing on the secondary windings of transformer 16, and will either be in phase or 180 degrees out of phase with the voltage appearing on said secondary windings and will vary in magnitude in accordance with the degree of error from the desired condition. The signal from bridge 10 is coupled to voltage amplifier 11 where it is amplified and in turn coupled to input terminals 67 and 68 of triode 65 of phase detector 12. Triode 65 is energized alternately with positive pulses of energy supplied from secondary winding 21 on transformer 16 as follows: when the top half of secondary winding 21 is negative, a small current will flow from the center tap on secondary winding 21 through conductor 70, triode 65, resistor 81, resistor 77, conductor 76, and through diode 74 to the top of secondary winding 21; when the top of secondary winding 21 is positive, a small current will flow from the center tap on secondary winding 21 through conductor 70, triode 65, resistor 81, resistor 78, conductor 75, and through diode 73 to the lower end of secondary winding 21. The resistors 71 and 72, constitute a small balanced load for the diodes 73 and 74. It should be noted that, while triode 65 is slightly conductive with no signal applied to its input terminals, the currents flowing through resistors 77 and 78 are equal and opposite so that there is no output appearing across output terminals 87 and 88. Assuming that the signal, resulting from the unbalance of bridge 10 is positive during the half-cycle that the upper end of transformer winding 21 is negative, it is seen that triode 65 will be more conductive in the output circuit that may be traced from cathode terminal 68, resistor 81 having condenser 82 in parallel therewith, resistor 77 having condenser 80 in parallel therewith, lead 76, resistor 71, and plate terminal 66, and less conductive in the output circuit of triode 65 which may be traced from cathode terminal 68, resistor 81 having condenser 82 in parallel therewith, resistor 78 having condenser 79 in parallel therewith, lead 75, resistor 72, and plate terminal 66. Under these conditions a larger D.C. potential will appear across resistor 77 and a smaller D.C. potential will appear across resistor 78, with the effect that output terminal 87 will be more negative than output terminal 88. The output of phase detector 12 is passed through rate network 13 and appears across resistor 94 which is in series with the source of negative potential from power supply 24, the potential developed across resistor 94 due to the output of phase detector 12, will be such as to oppose the source of negative potential and will be algebraically added to it, with the effect that the potential applied to grid terminal 97 to triode 95 will become less negative. When grid terminal 97 of triode 95 becomes less negative or tends to increase in a positive direction, triode 95 will become more conductive and relay coil 113 will become energized sufficiently to close contacts 116 causing current to flow from battery 31 to coil 119 and motor 15 thereby causing motor 15 to become operative in a direction to bring the control mechanism to the desired operating condition. As triode 95 becomes more conductive due to the decrease in negative potential at grid terminal 97, the negative potential, appearing at plate terminal 96 will increase in a negative sense and is in turn applied to grid terminal 102 of triode 100, to increase the negative potential appearing at grid terminal 102 and thereby decrease the conduction of triode 100. This further decreases the energization of relay coil 112 and thereby prevents the closure of contacts 117 associated with relay coil 112.

It will be seen that for a signal which is in phase with the lower half of secondary winding 21 and out of phase with the upper half of secondary winding 21, the voltage appearing at terminals 87 and 88 will be reversed in polarity with the effect that the negative potential appearing at grid terminal 97 will increase in a negative direction causing triode 95 to become less conductive which will in turn decrease the negative potential appearing at plate terminal 96 and thereby decrease the negative potential appearing at grid terminal 102. Triode 100 will become more conductive, thereby increasing the energization of its relay coil 112, contact 117 will close, and current will flow from battery 31 to coil 118 of motor 15 and cause motor 15 to operate in accordance with the signal input.

It is to be noted that with an increase in negative potential appearing at grid terminal 97 of triode 95, relay coil 113 will be effectively deenergized so that when contact 117 is closed, contact 116 is prevented from closing.

Tap 39 of potentiometer 38 is operatively connected to speed reducer 112 and moves in a direction to rebalance bridge 10 in a manner familiar to those skilled in the art.

While we have shown and described certain preferred embodiments of our invention, modifications will readily occur to those who are skilled in the art, and we therefore wish our invention to be limited only by the scope of the appended claims.

We claim:

1. Control apparatus comprising; a source of signal potential of variable magnitude and reversible phase; a device to be operated in accordance with said signal; means for amplifying said signal; a plurality of sources of alternating voltage; phase detecting means comprising a first variable current controlling device having output terminals and input terminals for controlling the current flowing between said output terminals in accordance with the voltage applied to said input terminals, first and second asymmetrically conductive current conducting devices, a plurality of output circuits for said first current controlling device each including the output terminals of said first current controlling device, one of said sources of voltage and one of said asymmetrically conductive devices, means for applying said current amplified signal to the input terminals of said first current controlling device so as to cause a relative current flow through said output circuits depending upon the magnitude of and the phase relationship of said amplified signal to said sources of voltages, and impedance means connected to said output circuits in a manner to cause a direct potential output across said impedance means of a magnitude and polarity in accordance with the relative current flow through said output circuits and hence in accordance with the phase and magnitude of said signal; and output means comprising second and third current controlling devices having input and output terminals, means connecting said impedance means to the input terminals of said second current controlling device to control the conductivity thereof in accordance with the output of said phase detector, a pair of relay means each having a capacior connected in parallel therewith, means connecting each of said relay means in circuit with one of said second and third current controlling devices and a third of said sources of voltage so that one or the other of said relay means is effectively energized depending upon the relative current conductivity of said second and third current controlling devices, and means connecting the voltage across said relay means in circuit with said second current controlling device to the input terminals of said third current controlling device in such a manner as to tend to render said third current controlling device nonconductive so that upon an increase in the output of said second current controlling device, said third current controlling device becomes less conductive to effectively deenergize the relay means associated therewith and upon said second current controlling device becoming less conductive, said third current controlling device becomes more conductive to increase the energization of the relay means associated therewith.

2. Control apparatus comprising; a source of signal potential; a device to be operated in accordance with said signal; a plurality of sources of alternating voltage; phase detecting means comprising a first current controlling device having output terminals and input terminals, a pair of asymmetrically conductive devices, a plurality of output circuits for said first current controlling device each including the output terminals of said first current controlling device, one of said sources of voltage and one of said asymmetrically conductive devices, means applying said signal to the input terminals of said first current controlling device, and impedance means connected to said output circuits in a manner to cause a direct potential output across said impedance means in accordance with said signal; output means comprising second and third current controlling devices having input and output terminals, means connecting the output of said phase detector to the input of said second current controlling device, a pair of relay means each having a capacitor connected in parallel therewith, means connecting each of said relay means in circuit with one of said second and third current controlling devices and a third of said sources of voltage, and means connecting the voltage across said relay means in circuit with said second current controlling device to the input terminals of said third current controlling device so that upon an increase in the output of said second current controlling device, said third current controlling device becomes less conductive to effectively deenergize the relay means associated therewith and upon said second current controlling device becoming less conductive to effectively deenergize its associated relay means, said third current controlling device becomes more conductive to increase the energization of the relay means associated therewith.

3. Control apparatus comprising; a source of signal potential of variable magnitude and reversible phase; a device to be operated in accordance with said signal; means for amplifying said signal; a plurality of sources of alternating voltage; phase detecting means having a direct potential output of magnitude and polarity in accordance with the magnitude and phase of said signal; and output means comprising second and third current controlling devices having input and output terminals, means connecting the output of said phase detector to the input of said second current controlling device to control the conductivity thereof in accordance with the output of said detector, a pair of relay means each having a capacitor connected in parallel therewith, means connecting each of said relay means in circuit with one of said second and third current controlling devices and one of said sources of voltage so that one or the other of said relay means is effectively energized depending upon the relative current conductivity of said second and third current controlling devices, and means connecting the voltage across said relay means in circuit with said second current controlling device to the input terminals of said third current controlling device in such a manner as to tend to render said third current controlling device nonconductive so that upon an increase in the output of said second current controlling device, said third current controlling device becomes less conductive to effectively deenergize the relay means associated therewith and upon said second current controlling device becoming less conductive, said third current controlling device becomes more conductive to increase the energization of the relay means associated therewith.

4. Control apparatus comprising; a source of alternating signal potential of variable magnitude and reversible phase; a device to be operated in accordance with said signal; a source of alternating potential; means for converting said signal into a unidirectional potential of variable magnitude and reversible polarity in accordance with said signal; and output means for energizing said device to be operated in accordance with said signal comprising first and second current controlling devices each having output and input terminals, a pair of relay means each having a capacitor connected in shunt, means connecting the output terminals of each of said current controlling devices in a circuit including one of said relay means and said source of alternating voltage, means connecting the output terminals of said first current controlling device to the input terminals of said second current controlling device, means connecting said unidirectional potential to the input terminals of said first current controlling device, said first current controlling device being more conductive or less conductive in accordance with said unidirectional potential and hence in accordance with said signal, thereby energizing its associated relay means on becoming more conductive and deenergizing said relay means on becoming less conductive, said second current controlling device being conductive inversely in relation to said first current controlling device whereby its associated relay means will be energized as said first current controlling device becomes less conductive and be deenergized on said first current controlling device becoming more conductive.

5. Control apparatus comprising; a source of alternating signal potential of reversible phase and variable magnitude; a device to be operated in accordance with said signal; a plurality of sources of alternating potential; phase detecting means for converting said alternating signal to a unidirectional potential comprising a first current controlling device having input and output terminals, means energizing said current controlling device, means connecting said signal to said input terminals, impedance means connected to the output terminals across which appears said unidirectional potential of polarity and magnitude in accordance with the phase and magnitude of said alternating signal; and output means comprising second and third input and output terminals, a pair of relay means each having a capacitor connected in shunt, means connecting each of said relay means in circuit with each of said current controlling devices including said output terminals and one of said sources of voltage, means connecting said unidirectional potential to said input terminals of said second current controlling device, means connecting the output terminals of said second current controlling device to the input terminals of said third current controlling device so that the conductivity of said third current controlling device varies inversely with the conductivity of said second current controlling device, said relays being energized in accordance with the conductivity of said second and third current controlling devices and hence in accordance with the phase and magnitude of said alternating signal source.

6. Control apparatus comprising; a source of alternating signal potential of variable magnitude and reversible phase; a device to be operated in accordance with said signal; a plurality of sources of alternating potential; phase detecting means for converting said alternating signal to a unidirectional potential of magnitude and polarity in accordance with the magnitude and phase of said alternating signal; and output means comprising first and second current controlling devices having input and output terminals, a pair of relay means having a capacitor connected in parallel therewith, means connecting said relays in an output circuit including one of said sources of alternating potential and said output terminals, impedance means connecting the output of said phase detecting means to the input terminals of said first current controlling device, means connecting the voltage appearing across the output terminals of said first current controlling device to the input terminals of said second current controlling device, said first current controlling device being conductive in accordance with the magnitude and polarity of said unidirectional potential and its associated relay being energized or deenergized in accordance with its conductivity, said second current controlling device being conductive in an inverse manner relative to said first current controlling device and its associated relay being energized or deenergized in accordance with its conductivity.

7. Control apparatus comprising; a source of alternating signal potential; a device to be operated in accordance therewith; a plurality of sources of alternating potential; means for converting said signal into a unidirectional potential; and output means comprising first and second current controlling devices each having output and input terminals, means connecting said unidirectional potential to said input terminals of said first current controlling device, first and second relay means each having a capacitor connected in parallel therewith, means connecting said first relay in circuit with the output terminals of said first current controlling device and one of said sources of voltage means connecting the voltage across said first relay to the input terminals of said second current controlling device, means connecting said second relay in circuit with said second current controlling device and said one of said sources of alternating voltage, said circuits arranged so that when said first current controlling device is conductive to effectively energize said first relay means, said second current controlling device becomes less conductive to effectively deenergize said second relay means and when said first current controlling device becomes less conductive to effectively deenergize said first relay means, said second current controlling device becomes more conductive to effectively energize said second relay means.

8. Control apparatus comprising; a source of alternating signal potential of variable magnitude and reversible phase; a device to be operated in accordance with said signal; a source of alternating potential; means for converting said alternating signal to a unidirectional potential of polarity and magnitude in accordance with the phase and magnitude of said alternating signal; and output means comprising a first and second relay means each having a capacitor connected in parallel therewith, first and second current controlling devices each having input and output terminals; means connecting said unidirectional potential to the input terminals of said first current controlling device, means connecting said first and second relay means in a circuit including the output terminals of said first and second current controlling devices respectively and one of said sources of alternating potential, means connecting the voltage appearing across said first relay means to the input terminals of said second current controlling device whereby said second current controlling device will become less conductive when said first current controlling device becomes more conductive and will become more conductive when said first current controlling device becomes less conductive whereby one or the other relay means will become effectively energized depending on the output of its associated current conducting device and said relay means are thereby prevented from operating simultaneously.

9. Control apparatus comprising means for producing a unidirectional input potential and of varying magnitude, load apparatus to be controlled in accordance with the magnitude of said potential, first and second current controlling devices for controlling said load apparatus, each of said current controlling devices having output and input terminals, output circuits for said current controlling devices connected to said output terminals thereof and including said load apparatus in such a manner that said load apparatus is differentially operated in accordance with the relative conductivity of said current controlling devices, means connecting said unidirectional input potential to said input terminals of said first current controlling device in order to vary the conductivity of said first current controlling device in accordance with the magnitude of said unidirectional potential, and means associated with the output circuit of said first current controlling device for varying the conductivity of said second current controlling device in a manner inversely to the conductivity of said first current controlling device and being such that when said first device is effectively conductive, said second current controlling device is maintained effectively nonconductive, and when said first device is effectively nonconductive, said second device is effectively conductive.

10. Electrical control apparatus comprising a source of unidirectional input potental of varying magnitude, load apparatus to be controlled in accordance with the magnitude of said potential, first and second current controlling devices for controlling said load apparatus, each of said current controlling devices having output and input terminals, output circuits for said current controlling devices connected to said output terminals thereof and including said load apparatus in such a manner that said load apparatus is differentially operated in accordance with the relative conductivity of said current controlling devices, and means interconnecting said first and second current controlling devices in such a manner so as to vary the conductivity of said second current controlling device in a manner inversely to the conductivity of said first current controlling device.

11. Control apparatus comprising means for producing a unidirectional input potential of varying magnitude, load apparatus to be controlled in accordance with the magnitude of said potential, first and second current controlling devices for controlling said load apparatus, each of said current controlling devices having output and input terminals, output circuits for said current controlling devices connected to said output terminals thereof and including said load apparatus in such a manner that said load apparatus is differentially operated in accordance with the relative conductivity of said current controlling devices, means connecting said unidirectional input potential to said input terminals of said first current controlling device in order to vary the conductivity of said first current controlling device in accordance with the magnitude of said unidirectional potential, and means associated with the output circuit of said first current controlling device for applying to the input terminals of said second current controlling device a voltage tending to render said second circuit controlling device nonconductive to an extent dependent upon the output of said first current controlling device, said voltage applied by said means to said input terminals being of such magnitude that when said first device is effectively conductive, said second current controlling device is maintained effectively nonconductive, and when said first device is effectively nonconductive, said second device is effectively conductive.

References Cited in the file of this patent

UNITED STATES PATENTS

| | | |
|---|---|---|
| 2,684,459 | Brown | July 20, 1954 |
| 2,701,327 | Ringoen | Feb. 1, 1955 |
| 2,727,992 | Wilson | Dec. 20, 1955 |